United States Patent [19]
Naven

[11] Patent Number: 5,936,956
[45] Date of Patent: Aug. 10, 1999

[54] DATA RECEIVING DEVICES

[75] Inventor: Finbar Naven, Cheadle Hulme, United Kingdom

[73] Assignee: Fujitsu Limited, Kawasaki, Japan

[21] Appl. No.: 08/688,093

[22] Filed: Jul. 29, 1996

[30] Foreign Application Priority Data

Aug. 11, 1995 [GB] United Kingdom ............... 9516512

[51] Int. Cl.$^6$ .............................. G06F 13/00; G06F 7/00
[52] U.S. Cl. ........................ 370/395; 370/397; 370/412
[58] Field of Search ................................. 370/395, 397, 370/399, 412–418, 463

[56] References Cited

U.S. PATENT DOCUMENTS

| | | | |
|---|---|---|---|
| 5,163,046 | 11/1992 | Hahne et al. | 370/409 |
| 5,278,828 | 1/1994 | Chao | 370/418 |
| 5,311,509 | 5/1994 | Heddes et al. | 370/412 |
| 5,600,820 | 2/1997 | Johnston | 395/497.02 |

FOREIGN PATENT DOCUMENTS

| | | |
|---|---|---|
| 0 344 865 | 12/1989 | European Pat. Off. . |
| 409149050 | 6/1997 | Japan ............... H04L 12/28 |
| 1 581 061 | 12/1980 | United Kingdom . |
| 91/13398 | 9/1991 | WIPO . |
| 95/14269 | 5/1995 | WIPO . |

OTHER PUBLICATIONS

*The ATM–POL2: Quad UPC Power*, "Number of handled connections," published by AtecoM, Dec. 1994, pp. 6–7.

*Primary Examiner*—Melvin Marcelo
*Attorney, Agent, or Firm*—Staas & Halsey LLP

[57] ABSTRACT

A data receiving device, for receiving data from an ATM network, has a data storage circuit (38) for allocating preselected virtual channels of the network with respect to corresponding storage regions (5r) in a local memory (5) connected with the device. The storage regions are in the form of linked lists. When data items belonging to the different preselected virtual channels are received in succession by the device, the data storage circuit (38) stores those items in the storage regions that correspond respectively to the items' virtual channels. As a result, transfer of the received data items from the local memory (5) to a further connected apparatus (7) connected with the device, is performed in a different channel order form that in which those items were received by the device from the network. The latter transfer may be performed by the connected further apparatus or by a data transfer circuit (40) of the device.

23 Claims, 7 Drawing Sheets

| 31 | | 0 |
|---|---|---|
| CRC (32) | | |
| WRITE FRAME START (16) | RESERVED | |
| READ FRAME END (16) | RESERVED | |
| WRITE CELL COUNT (16) | WRITE BYTE COUNT (16) | |
| READ CELL COUNT (16) | READ BYTE COUNT (16) | |
| WRITE LAST CELL (16) | WRITE STATUS (16) | |
| READ FIRST CELL (16) | READ STATUS (16) | |
| RESERVED | | |

FIG. 3

| CPC SIZE | TOTAL BITS P + C | POINTERS (n) |
|---|---|---|
| 0 | 7 | 128 |
| 1 | 8 | 256 |
| 2 | 9 | 512 |
| 3 | 10 | 1024 |
| 4 | 11 | 2048 |
| 5 | 12 | 4096 |
| 6 | 13 | 8192 |

FIG. 7 (A)

| VPI SIZE | P BITS |
|---|---|
| 0 | 1 |
| 1 | 2 |
| 2 | 3 |
| 3 | 4 |

FIG. 7 (B)

| THRESHOLD PARAMETER | | THRESHOLD LEVEL |
|---|---|---|
| 0 | 0 | 1 CELL |
| 0 | 1 | 1 FRAME |
| 1 | 0 | SPECIFIED BY FIRST THRESHOLD REGISTER |
| 1 | 1 | SPECIFIED BY SECOND THRESHOLD REGISTER |

| PRIORITY PARAMETER | | PRIORITY LEVEL |
|---|---|---|
| 0 | 0 | 0 (HIGHEST) |
| 0 | 1 | 1 |
| 1 | 0 | 2 |
| 1 | 1 | 3 (LOWEST) |

DATA RECEIVING DEVICES

BACKGROUND OF THE INVENTION

1. Field of the Invention

The present invention relates to data receiving devices for use, for example, to connect personal computers to ATM communications networks.

2. Description of the Prior Art

A personal computer often requires connection to a data communications network in order for the computer to be able to transmit and receive data to/from other devices. The personal computer is normally connected to such a communications network via a dedicated communications control device which may be referred to as a terminal controller (TC). Such a terminal controller is employed to control as many aspects as possible of the data transfer between the computer and the communications network, leaving the computer's central processing unit (CPU) free to perform the primary data processing tasks of the computer.

A recently-proposed type of communications network, suitable for data communications, is an asynchronous transfer mode network or ATM network. In an ATM network, data is transported in fixed-length cells, each cell having a data or payload portion, for transporting a predetermined amount of data (48 bytes), and a header portion, of 5 bytes, which contains control and addressing information for the cell.

ATM networks are designed to be capable of providing up to 256 separate communications paths, termed "virtual paths", and each of these virtual paths can contain as many as 65,536 individual data channels, which are termed "virtual channels". To identify to which virtual channel an ATM cell belongs, each cell carries in its header portion a "cell address" which includes a virtual path identification (VPI) portion and a virtual channel identification (VCI) portion. With a maximum of 256 virtual paths and 65,536 virtual channels in each virtual path, there may be up to 16.7 million different cell addresses.

A personal computer may require access to a number of different preselected virtual channels for different communications purposes. Thus, some of the preselected virtual channels may be high priority channels used, for example, for video links. Data received from the ATM network for such high priority channels must be transferred by the terminal controller to the main memory of the personal computer as quickly as possible to avoid picture degradation or slow-motion. Other virtual channels may be low priority channels used, for example, for transfer of low bit-rate data. For these channels, some delay in transfer of data received from the ATM network to the main memory may be permissible.

At an egress node of an ATM network, cells belonging to high priority channels are inevitably interleaved with cells belonging to low priority channels. A problem may therefore arise in that conventionally the cells received at the egress node from the ATM network are transferred to the main memory in the same order as that in which they are received, which leads to blocking of data for high priority channels by data for low priority channels. To prevent such blocking the low priority channel data must be transferred to the main memory with the same priority as the high priority channel data, but this defeats the object of prioritising the channels and may interrupt the other activities of the personal computer to an unacceptable extent, for example by overburdening the computer's central processing unit.

BRIEF SUMMARY OF THE INVENTION

According to the present invention there is provided a data receiving device, for receiving data from an ATM network, having data storage means for allocating preselected virtual channels of the network respective corresponding storage regions in memory means connected with the device when it is in use, and operable, when data items belonging to the different preselected virtual channels are received in succession by the device, to store those items in the storage regions that correspond respectively to the items' virtual channels, thereby to permit transfer of the received data items, from the memory means to further apparatus connected with the device when it is in use, to be performed in a different channel order from that in which those items were received by the device from the network.

In such a device the received data items belonging to high-priority channels can be transferred to the further apparatus in preference to the data items belonging to low-priority channels, thereby preventing blocking of the high-priority channel data by the low-priority channel data.

In one preferred embodiment the device has queue control means for controlling a receive queue and operative, following storage by the data storage means of one or more data items belonging to one of the preselected virtual channels in the storage region corresponding to that virtual channel, to add a new entry to the receive queue identifying the virtual channel concerned as having stored data for transfer to such further apparatus. The entry concerned may, for example, be deleted from the queue upon completion of such transfer of the stored data to the further apparatus.

The receive queue can then be read by the connected further apparatus, for example a central processor unit, to enable it to keep track of the received data.

The queue control means are preferably operable to generate an interrupt signal for application to the further apparatus when a new entry is added to the receive queue. This permits the further apparatus to operate efficiently without having to continually read the receive queue.

Priority designating means are preferably connected with the queue control means for assigning to each preselected virtual channel one of a plurality of different priority levels, and the queue control means may include as part of each entry added to the receive queue priority information indicating the priority level assigned to the channel concerned. Such a device may be used in a data processing apparatus further including: a control unit for controlling operation of the apparatus; a main memory; bus means interconnecting the control unit, main memory and data receiving device; and a local memory connected with the data receiving device for providing the memory means. In such apparatus, the control unit can monitor the entries in the receive queue of the data receiving device to determine the channel order in which data is to be transferred from the storage regions of the local memory to the main memory, and then control the bus means to effect such transfer in the determined order.

In a further preferred embodiment, priority designating means are connected with the queue control means for assigning to each preselected virtual channel one of a plurality of different priority levels, and the queue control means serve to control a plurality of such receive queues corresponding respectively to the different priority levels. Following storage by the data storage means of one or more data items belonging to one of the preselected virtual channels, the queue control means add a new entry to the receive queue corresponding to the designated priority level of the channel concerned. This use of separate receive queues avoids the problem, which occurs when a single receive queue is used for recording all entries irrespective of priority, of having to scan through all the entries to identify the high-priority channels. Furthermore, the entries in the different channels need not include the priority information.

In one embodiment, the device further includes data transfer means operative to monitor the entries in the different receive queues to determine the channel order in which data is to be transferred from the storage regions of the memory means to the further apparatus. With such an embodiment the further apparatus need not monitor the receive queues and the transfer of data to it is performed by the data receiving device itself, thereby reducing the burden on the further apparatus.

Such a device can, by way of example, be employed in data processing apparatus further including: a control unit for controlling operation of the apparatus; a main memory; bus means interconnecting the control unit, main memory and data receiving device; and a local memory connected with the data receiving device for providing the memory means. The data receiving device is preferably provided with bus control means connected with the data transfer means of the device for controlling the bus means independently of the control unit to facilitate transfer of data by the data transfer means directly from the storage region of the local memory to the main memory. This can permit such transfer to be performed by the device, for example by direct memory access (DMA) to the main memory, without significant intervention of the control unit, leaving the control unit free to concentrate on the primary data processing tasks of the apparatus.

In such a case, the data transfer means of the device normally transfer data in the order starting with channels having entries in the highest-priority-level receive queue and ending with the channels having entries in the lowest-priority-level receive queue, but are preferably operable to suspend transfer of data from channels having entries in a lower-priority-level receive queue when a new entry is placed on a higher-priority-level receive queue.

This suspension of lower-priority channel transfers in favor of higher-priority transfers enhances the throughput of the high-priority channel data.

The queue control means are preferably operable to generate an interrupt signal for application to the further apparatus when a new entry is added to the receive queue. This permits the further apparatus to operate efficiently without having to continually read the receive queue.

In one preferred embodiment, threshold designating means are connected with the queue control means for designating, for each preselected virtual channel, a threshold level of data, and the queue control means are operable to add a new entry relating to one of the preselected virtual channels to the receive queue, or to the relevant one of the receive queues as the case may be, only when the amount of data stored in the storage region corresponding to that channel exceeds the designated threshold level.

In this way the receive queue(s) is (are) only added to when the threshold amount of data exists in the memory means for transfer to the further apparatus. For example, the stored data can then be transferred in relatively large blocks which is less burdensome to the further apparatus.

Preferably, the data storage means allocate to each preselected virtual channel a linked list of data blocks within the memory means, which linked list of data blocks provides the corresponding storage region for the virtual channel concerned. The use of linked lists provides efficient and flexible allocation of data storage resources within the memory means, since each linked list can change in size dynamically to accommodate the incoming and outgoing data rates. It is not necessary to reserve fixed amounts of memory for each channel.

Each data item is, for example, constituted by a payload portion of an ATM cell, and in one preferred embodiment the data storage means employ the linked list for each preselected virtual channel to concatenate the respective payload portions of successively-received ATM cells belonging to the same AAL frame of the channel concerned, thereby to permit such frames to be reconstituted in the storage region corresponding to the channel concerned. This avoids the need for the connected further apparatus to perform this task and enables error checking based on the frame to be carried out by the device prior to transfer of the data to the further apparatus.

The data storage means preferably store, for each preselected virtual channel, control information for use in storing the received data items in the linked list for the channel concerned and/or for use in retrieving those stored data items from the linked list for transfer to the further apparatus. The channel information may include, for example, a write pointer, indicating the location in the memory means of the last data block in the linked list in which the data of a received ATM cell was stored, and a read pointer indicating the location in the memory means of the next data block in the linked list that is to be transferred to the further apparatus.

In a preferred embodiment, the preselected virtual channels are selectable freely from within a group of available virtual channels of the network, and the device further includes address translation means having access, when the device is in use, to a channel map having entries corresponding respectively to the available virtual channels of the group. Each of the entries identifies one of a plurality of control information storage portions that is associated individually with the virtual channel concerned. The control information storage portions of the plurality are fewer in number than the available virtual channels of the group, and each control information storage portion is used for storing the control information of its associated virtual channel. In such a case, the address translation means are operable, when a data item is received from the ATM network, to determine the virtual channel to which the item belongs from addressing information carried by the item and to identify from the entry in the channel map that corresponds to that virtual channel the control information storage portion associated with that virtual channel, so as to permit access by the data storage means to the control information for that virtual channel.

Such a device can be regarded as having a set of output channels, each of which has its own storage region (linked list) in the memory means and also has its own control information storage portion storing the control information for the channel concerned. The channel map enables the virtual channels that are to be used for data communication to be selected freely, from amongst the group of available channels, and "maps" each such selected virtual channel to its own separate output channel. The channel map can be stored in a memory device, for example a ROM or a static RAM, which can be provided on the same chip as the data receiving device or can be provided separately. In the case of a RAM the mapping information for the selected virtual channels can be set up in advance by the connected further apparatus, for example a CPU in a personal computer, in an initialisation procedure, and can be changed during use if the communications requirements of the further apparatus change.

In this way the channel map serves as a form of look-up table, the location in the table of the required entry (mapping information) for the cell's virtual channel being determined simply and conveniently from the addressing information carried by the cell. This allows the mapping information to be accessed very quickly, without the need for complex searches.

Because the channel map maps only the selected virtual channels to respective output channels, the control information can be associated with the output channels which are far fewer in number than the total available virtual channels in the group. Thus, it is not necessary for space to be reserved for storing control information for every available virtual channel; space need only be reserved for storing control information for the relatively few selected virtual channels.

The address translation means may determine the entry in the channel map that corresponds to the received data item's virtual channel in dependence only upon a restricted portion of the addressing information carried by the received data item, which restricted portion is selectively-changeable in dependence upon a control signal applied to the device. For example, the address translation means may determine the corresponding entry in the channel map from one or more least significant bits of the virtual path identifier (VPI) field of the addressing information and one or more least significant bits of the virtual channel identifier (VCI) field of the addressing information. In this way, more VCI bits and less VPI bits can be selected when the required number of virtual paths is low but the required number of virtual channels in each virtual path is high, and conversely more VPI bits and less VCI bits can be selected when the required number of virtual paths is high but the required number of virtual channels in each virtual path is low. In each case the total number of VPI and VCI bits can still be desirably small, so that the storage space required for the channel map is also desirably small.

BRIEF DESCRIPTION OF THE DRAWINGS

FIG. 3 shows a diagram for use in explaining the format of a descriptor used by the FIG. 1 device;

FIGS. 7(A) and 7(B) show respective tables for use in explaining how different groups of virtual channels can be selected in the FIG. 1 device.

DETAILED DESCRIPTION OF THE PREFERRED EMBODIMENTS

Figure 1:
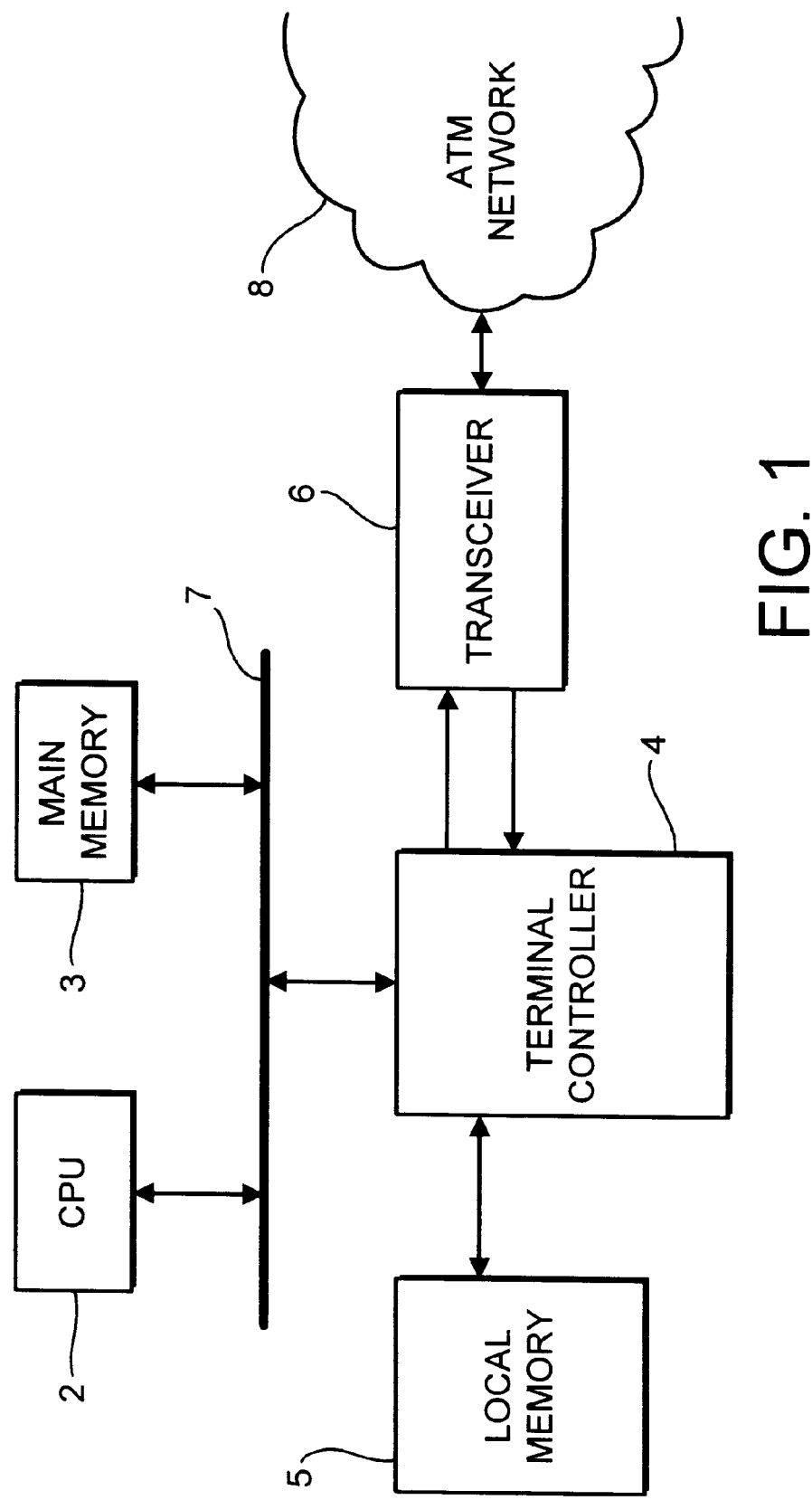
FIG. 1 shows a schematic block diagram of a personal computer including a data receiving device embodying the present invention.

In FIG. 1, a personal computer 1 includes a central processing unit (CPU) 2, a main memory 3, a terminal controller 4, a local memory 5 and a transceiver unit 6.

The CPU 2, main memory 3 and terminal controller 4 are connected to a system bus 7 which enables data and control signals to pass between them.

The local memory 5 and transceiver unit 6 are each connected directly to the terminal controller 4. The transceiver unit 6 is connected to an ATM communication network 8.

In use of the FIG. 1 arrangement, the terminal controller 4 serves to control the local memory and transceiver unit 6 in such a way as to enable data to be transferred between the main memory 3 and the ATM network 8 on a plurality of separate duplex channels.

The ATM network 8 may have up to 16 million ($2^{24}$) virtual channels in use, whereas the personal computer normally requires access to only a small subset of the available virtual channels, for example between 32 and 4,096 channels. Thus, in the data receiving direction, data received from the desired virtual channels of the ATM network must be passed by the terminal controller 4 to the main memory 3, with the data from each virtual channel being kept separate from that of the other virtual channels.

The transfer of the received data from the ATM network to the main memory 3 is performed in two stages: in the first stage, the received data from the transceiver unit 6 is buffered temporarily in the local memory 5, and then in the second stage, the data is transferred by the terminal controller 4 to the main memory 3 via the system bus 7. This two-stage approach has the advantage that data can be transferred to the main memory 3 independently of the order in which it is received from the transceiver unit 6.

In the first stage of the transfer process, the data received from each desired virtual channel is stored in a receive data region 5r of the local memory 5 in the form of a linked list of data blocks. Each virtual channel must be allocated a separate linked list, so that the data received from each virtual channel is kept separate from that of the other channels. Thus, each linked list effectively constitutes one of a plurality of output channels of the terminal controller 4.

Figure 2:
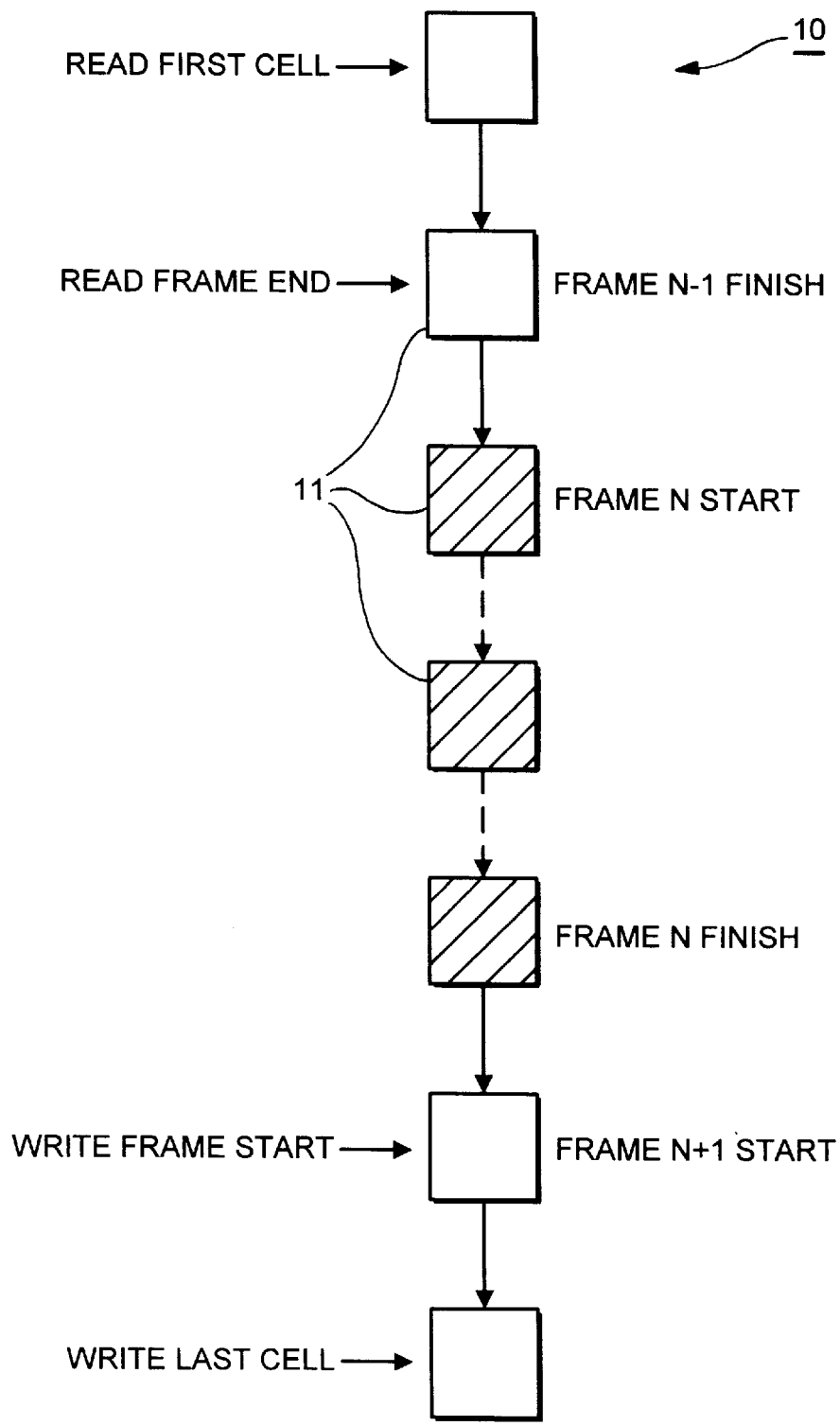
FIG. 2 shows a diagram for use in explaining the format of data in an output channel of the FIG. 1 device.

As shown in FIG. 2, the linked list 10 for each output channel comprises a series of linked data blocks 11, each block having a storage capacity of 64 bytes.

Data is transmitted via an ATM virtual channel in the form of ATM adaptation layer (AAL) frames, each frame comprising a plurality of ATM cells. The cells of the frame are transmitted successively (not necessarily together), each time a cell transmission is scheduled for the particular virtual channel by the ATM network.

Each AAL frame includes overhead information for control purposes, for example cyclic redundancy check (CRC) information.

The terminal controller 4 employs the linked list 10 for each output channel to concatenate the respective payloads of the received cells belonging to the same AAL frame, thereby to enable the transmitted AAL frame to be reconstituted in the output channel.

Thus, as shown in FIG. 2, the linked list 10 for a particular output channel will contain at a typical instant a succession of AAL frames N-1, N, N+1, each frame containing the respective data payloads of a plurality of successively-received ATM cells for the virtual channel associated with the output channel.

In order to control the output channels, the terminal controller 4 has, for each channel, a so-called "descriptor" which contains, inter alia, information needed to store data in the linked list in the first stage of the above-mentioned two-stage data transfer operation and to retrieve the stored data from the linked list in the second stage for transfer to the main memory 3 of the personal computer. As will be described in more detail hereinafter, these descriptors are themselves stored in the local memory 5.

An example of the format of the information held in one of the channel descriptors is shown in FIG. 3. In this example, the descriptor contains 14 fields and occupies 16 words.

The Write Frame Start, Write Last Cell, Write Cell Count, Write Byte Count and Write Status fields, are used when adding a newly-received cell payload to the linked list. The Write Frame Start and Write Last Cell fields indicate respectively the start and finish locations in the linked list of the frame (Frame N+1 in FIG. 2) currently being added to the list. The Write Cell Count and Write Byte Count fields indicate respectively the number of blocks and the number of bytes in the frame currently being added to the list. The Write Status field includes control information, for example a bit for indicating when a cyclic redundancy check (CRC) error is detected in the current frame being added to the list.

The Read First Cell, Read Frame End, Read Cell Count, Read Byte Count and Read Status Fields are used when reading the content of a stored data frame from the linked list for transfer to the main memory 3. The Read First Cell and Read Frame End fields indicate respectively the start and finish locations in the linked list of the frame (Frame N−1 in FIG. 2) currently being read from the list. The Read Cell Count and Read Byte Count fields indicate respectively the number of blocks and the number of bytes in the frame currently being read from the list. The Read Status field includes control information concerning the current frame being read.

The storage of the received data in separate linked lists for the different output channels can enable the data of the different output channels to be transferred to the main memory 3 in an order independent of that in which it was received by the terminal controller 4. For example, the CPU 2 can inform the terminal controller 4 that it has designated certain output channels as having a higher priority than other output channels so that cells received by those higher-priority channels can be processed (transferred to the main memory) in preference to cells received by the lower-priority channels.

Figure 4:
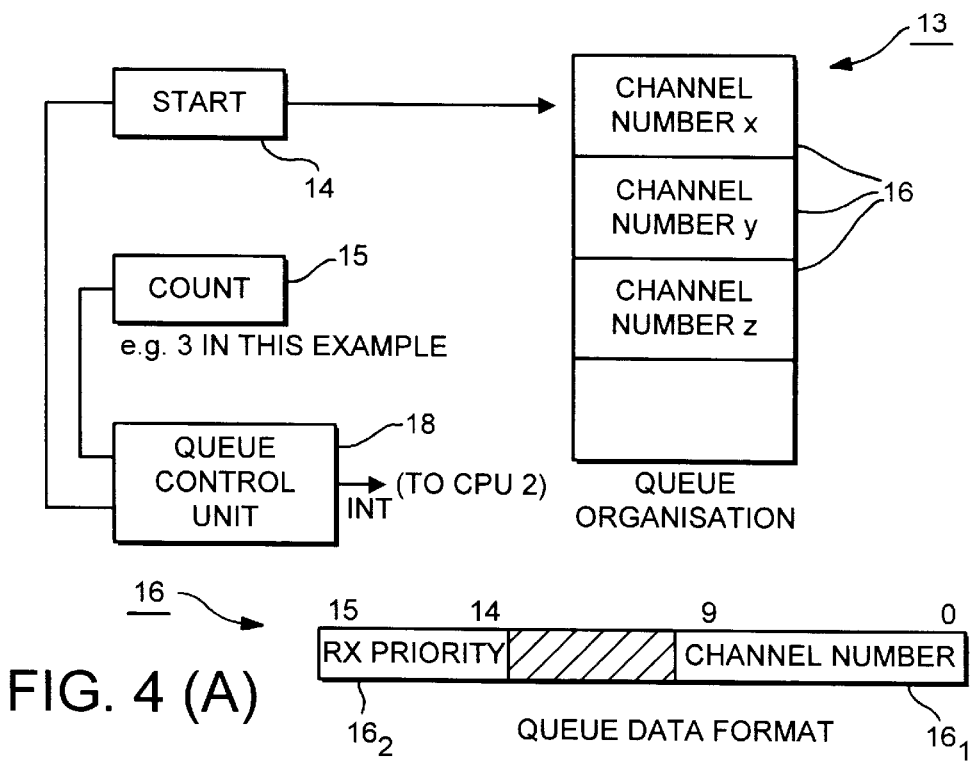
FIGS. 4(A) to 4(C) show diagrams for use in explaining the constitution and operation of parts of a first embodiment of the the present invention.

In one embodiment of the invention, the CPU 2 itself performs the transfer of data from the terminal controller 4 to the main memory 3 and to enable the CPU 2 to control such transfer the terminal controller 4 maintains a receive queue 13 in a queue storage region $5q$ of the local memory 5, as shown in FIG. 4(A). The queue 13 is organised, for example, as a circular buffer controlled by two registers 14 and 15, the first of which (START) points to the first location within the local memory of the queue, and the other of which (COUNT) stores the number of entries in the queue.

Each entry 16 in the receive queue has a channel number field $16_1$, (bits 0 to 9), for specifying an output channel number, and a priority field $16_2$ (bits 14 and 15), for specifying a priority parameter, as explained below. The remaining bits of each entry 16 are unused.

A queue control unit 18 is provided for controlling the queue 13 and the registers 14 and 15.

A new entry relating to an output channel is placed on the receive queue by the queue control unit 18 when the amount of data held in the data storage region $5r$ of the local memory 5 for the output channel concerned exceeds a predetermined threshold level. That level is specified by a threshold parameter contained in the descriptor for the output channel concerned. This threshold parameter has two bits and can have one of four different values, as shown in FIG. 4(B).

When the threshold parameter has a first value (0,0) the threshold level is one cell, and when the threshold parameter has a second value (0,1) the threshold level is one frame.

The terminal controller 4 also has first and second threshold registers (not shown), each of which can store a threshold level specified by the CPU 2, indicating the number of cells which are to be stored before an entry is made in the receive queue. When the threshold parameter has a third value (1,0) the threshold level stored in the first threshold register is used as the threshold level for the channel concerned, whereas when the threshold parameter has a fourth value (1,1) the threshold level stored in the second threshold register is used as the threshold level for the channel concerned.

When the threshold parameter for an output channel has the third or fourth value an entry in the receive queue is made for the channel upon storage of the final cell of an AAL frame if this occurs before the number of cells specified in the relevant threshold register have been stored.

The descriptor for each output channel also contains a two-bit priority parameter which can also have one of four different values (0,0;0,1;1,0;1,1, ) in this example, as shown in FIG. 4(C). The value 0,0 denotes the highest priority level (0), and the value 1,1 denotes the lowest priority level (3).

When a new entry, specifying a particular output channel, is to be added to the receive queue (i.e. the data in the local memory for that channel exceeds the relevant threshold level) the priority parameter for the channel is retrieved from the descriptor for that channel and stored in the first available entry of the receive queue 13 along with the output channel number. The address of that first available entry is found by summing the respective contents of the START and COUNT registers 14 and 15. The CPU 2 can then "scan" the queue 13 (using the queue control unit 18) and decide, based on the priority parameters of the entries 16 in the queue, the transfer order of the channels.

The START and COUNT registers 14 and 15 are controlled by the queue control unit 18 as follows. When the CPU 2 reads an entry 16 from the queue 13 the queue control unit 18 increments the START register 14 automatically. The COUNT register 15 is incremented by the queue control unit 18 when an entry is added to the queue and decremented by the queue control unit 18 when an entry is read from the queue by the CPU 2.

The queue control unit 18 notifies the CPU 2, by transmitting thereto an interrupt signal (INT), when an entry is first placed in the receive queue. The CPU 2 must empty the queue again before a subsequent interrupt signal can be generated. Thus, in response to the interrupt signal the CPU 2 reads the COUNT register 15 to determine the number of entries in the queue, and then, after retrieving that number of entries from the queue, must read the COUNT register again to check for additional entries that may have occurred since the original interrupt signal.

In a further embodiment of the invention, the terminal controller 4 serves as a bus master device that is operable itself to perform the second stage of the data transfer operation, i.e. the transfer from the local memory 5 to the main memory 3, using the bus 7. This avoids the need for the CPU 2 to perform this data transfer operation, and so leaves the CPU 2 free to perform its primary data processing tasks.

In this further embodiment the output channel descriptors each store threshold and priority parameters as described above. However, instead of a single receive queue, there are four receive queues $13_0$ to $13_3$, corresponding respectively to the four different priority levels (0 to 3), in the queue storage region 5q, as shown schematically in FIG. 5. Each receive queue $13_i$ has associated first (START) and second (COUNT) registers $14_i$ and $15_i$. A queue control unit 18' is provided for controlling the four queues and their associated registers.

As described previously, when the amount of data in the local memory for a particular channel exceeds the relevant threshold level, an entry 16' relating to that channel is placed in the receive queue. corresponding to the channel's priority parameter value. Each entry 16' in this case only specifies the output channel number.

Figure 5:
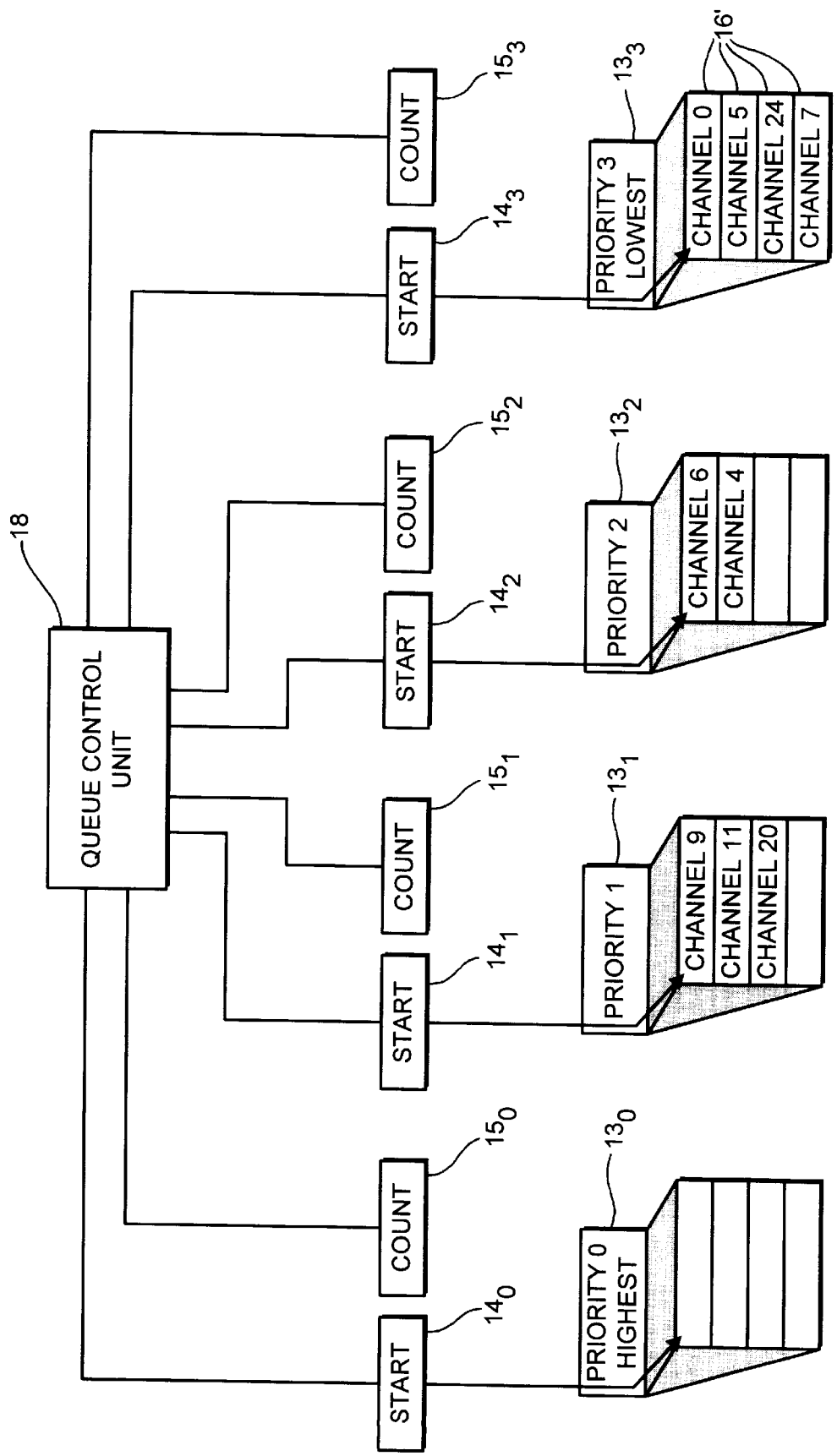
FIG. 5 shows a diagram for use in explaining the constitution and operation of corresponding parts of a second embodiment of the present invention.

The receive queues $13_0$ to $13_3$ are automatically serviced in priority order by the terminal controller 4 to transfer, under its own control, the received data from the local memory 5 to the main memory 3. FIG. 5 shows the state of the receive queues following completion of transfers from all of the channels in the highest-priority-level queue $13_0$. Transfer of data then commences with the output channel identified in the first entry of the next-highest-priority receive queue (priority level 1) $13_1$, in this case channel 9, pointed to by the START register $14_1$ for receive queue $13_1$. After the transfer of the data for output channel 9, the START register $14_1$ for the receive queue $13_1$ is incremented and transfer of data for the channel identified in the next entry, in this case channel 11, commences. If, for example, during transfer of data for channel number 11 an entry is placed on the highest-priority-level receive queue $13_0$, because data has been received for one of the designated highest-priority-level channels, the terminal controller 4 suspends transfer of data for the lower-priority channel number 11, and deals with transfer of data for the highest-priority channel.

It is not necessary for the CPU 2 to monitor or read the receive queues in this embodiment, nor is it necessary for the terminal controller to generate interrupts to notify the CPU 2 of the presence of entries in the receive queues, since the terminal controller itself performs the data transfer to the main memory 3 in this embodiment.

By assigning different output channels different priority levels, higher priority traffic can be processed in preference to lower priority traffic, which leads to less blocking and a more efficient throughput of data from the ATM network 8 to the main memory 3.

It will be seen that one descriptor is required for each virtual channel which the personal computer has selected to use for data transfer. These virtual channels must be freely selectable, at least from a relatively large group of possible virtual channels.

One possibility would be to provide storage space for as many descriptors as there are virtual channels in the group of possible virtual channels. However, in a typical example in which there are 4,096 virtual channels in the group, this would require the memory to have a capacity of 64 k words, which leads to an unacceptable cost. In addition, because most of the virtual channels of the group of 4,096 would not be used by the personal computer, providing descriptors for all channels in the group leads to a large number of redundant descriptors, with the result that the memory space is used highly inefficiently.

In a preferred embodiment of the present invention, descriptors are only stored for those virtual channels that have been preselected by the CPU 2 for use in data transfer, whilst enabling the virtual channels concerned to be selected desirably freely.

In the data receiving direction, each virtual channel which the CPU 2 has preselected for use in data transfer is associated with a particular output channel of the terminal controller 4, so that data received from the virtual channel concerned is passed by the terminal controller 4 to that output channel. Any one of a predetermined group of virtual channels can be associated with one of the output channels, giving total freedom of selection of virtual channels from amongst that group. Descriptors are stored only for those virtual channels of the predetermined group that have been associated with output channels of the terminal controller, so that it is not necessary to store descriptors for all the virtual channels of the group.

Figure 6:
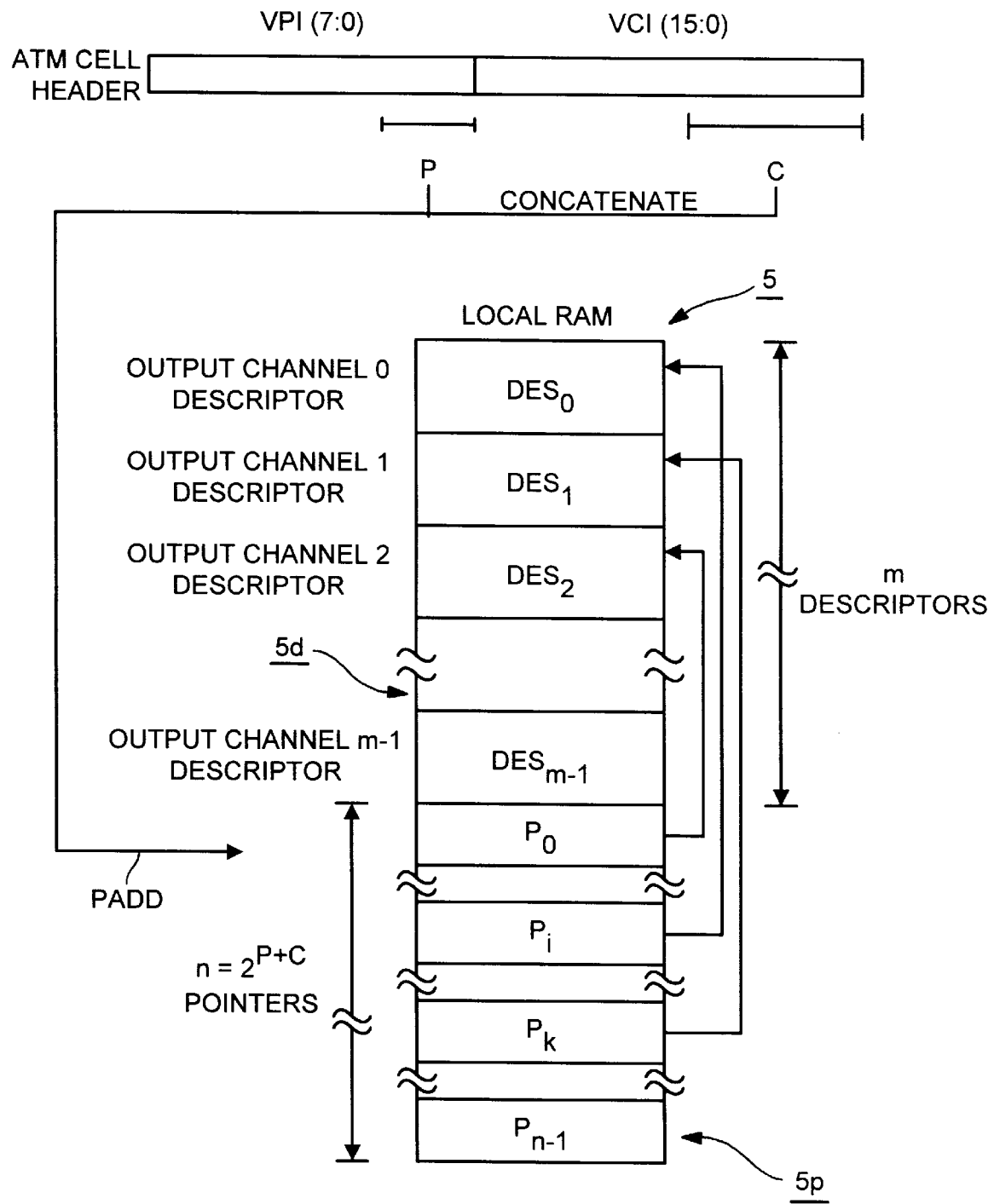
FIG. 6 shows a schematic diagram for use in explaining operation of the FIG. 1 device.

One preferred way in which the preselected virtual channels can be associated with respective output channels is illustrated in FIG. 6. As shown in FIG. 6, the local memory 5 is provided with two separate storage regions, namely a descriptor storage region 5d and a pointer storage region (or channel map) 5p. Respective channel descriptors $DES_0$ to $DES_{m-1}$ for m output channels $OC_0$ to $OC_{M-1}$ of the terminal controller 4 are stored one after the next in the descriptor storage region 5d. The pointer storage region 5p has a capacity for storing n pointers $P_0$ to $P_{n-1}$ corresponding respectively to a predetermined group of n virtual channels of the ATM network 8, from which group the virtual channels to be associated with the output channels can be selected (n≧m).

The pointers $P_0$ to $P_{n-1}$ must be set up by the CPU 2 during initialization of the terminal controller 4. For example, as shown in FIG. 6, the pointer $P_0$ for virtual channel $VC_0$ is set up in advance to point to the descriptor $DES_2$ for output channel $OC_2$, the pointer $P_i$ for virtual channel $VC_i$ is set up to point to the descriptor $DES_0$ for output channel $OC_0$, and the pointer $P_k$ for virtual channel $VC_k$ is set up to point to the descriptor $DES_1$ for output channel $OC_1$.

When an ATM cell is received by the terminal controller 4 from the transceiver unit 6, the cell address (VPI/VCI fields) carried in the header portion of the cell is used to obtain a pointer address PADD, which is the address, in the pointer storage region 5p, of the pointer for the virtual channel to which the cell belongs. As indicated in FIG. 6, the pointer address PADD is formed by concatenating the P least-significant bits of the VPI field of the cell address and the C least-significant bits of the VCI field of the cell address.

The pointer for the virtual channel concerned is then read from the pointer address PADD and used to access the descriptor of the output channel that has been preselected to correspond to that virtual channel. Using the information in the "Write" fields of the descriptor, the data of the ATM cell can then be added to the linked list for the relevant output channel, held in the receive data region 5r of the local memory 5.

It will be appreciated that, because each pointer requires less space in the local memory than each descriptor (for example 2 bytes as compared to 16 words), although there must be as many pointers (n) as there are virtual channels in the predetermined group, overall there is a significant saving in memory space because of the reduction in the number of descriptors to just the number (m) actually used by the terminal controller 4 for data transfer.

It will be seen that the relationship between P, C and the number of channels n in the predetermined group is $2^{P+C}=n$. There are some instances in which the personal computer requires access to many different virtual channels in the same few virtual paths (P low, C high) and other instances in which access to many different virtual paths is required but with only a few virtual channels in each path (P high, C low). To give flexibility to deal effectively with these possibilities, in a preferred feature of the present invention, the predetermined group of virtual channels can be varied selectively by the CPU 2 by setting the values of P and C to be used by the terminal controller in deriving the pointer address PADD. The values of P and C can be set during initialisation of the terminal controller, for example by providing respective VPI and CPC size parameters to the terminal controller. The CPC size parameter determines P+C, i.e. the total number of bits in the pointer address PADD, as shown in FIG. 7(A). The VPI size parameter determines P, i.e. the number of bits in the VPI identifier to be used in forming the pointer address PADD, as shown in FIG. 7(B). In this way, the values of P and C can be chosen such that in each application of the terminal controller 4 the minimum number of pointers is required, so that the size of the pointer storage region 5p of the local memory 5 can be reduced.

It will be appreciated that different virtual paths of the ATM network may have different numbers of active virtual channels, and the P and C values must be selected to be large enough to provide access to any desired active virtual channel in any active virtual path. This may mean that the pointers of some virtual channels are redundant, because they relate to inactive virtual channels. These pointers can all be preset to point to a single dummy descriptor in the descriptor storage region 5d, which dummy descriptor denotes a null output channel. Because the inactive virtual channels are not allocated respective descriptors, however, the storage space required for the descriptors in the local memory is minimized.

Figure 8:
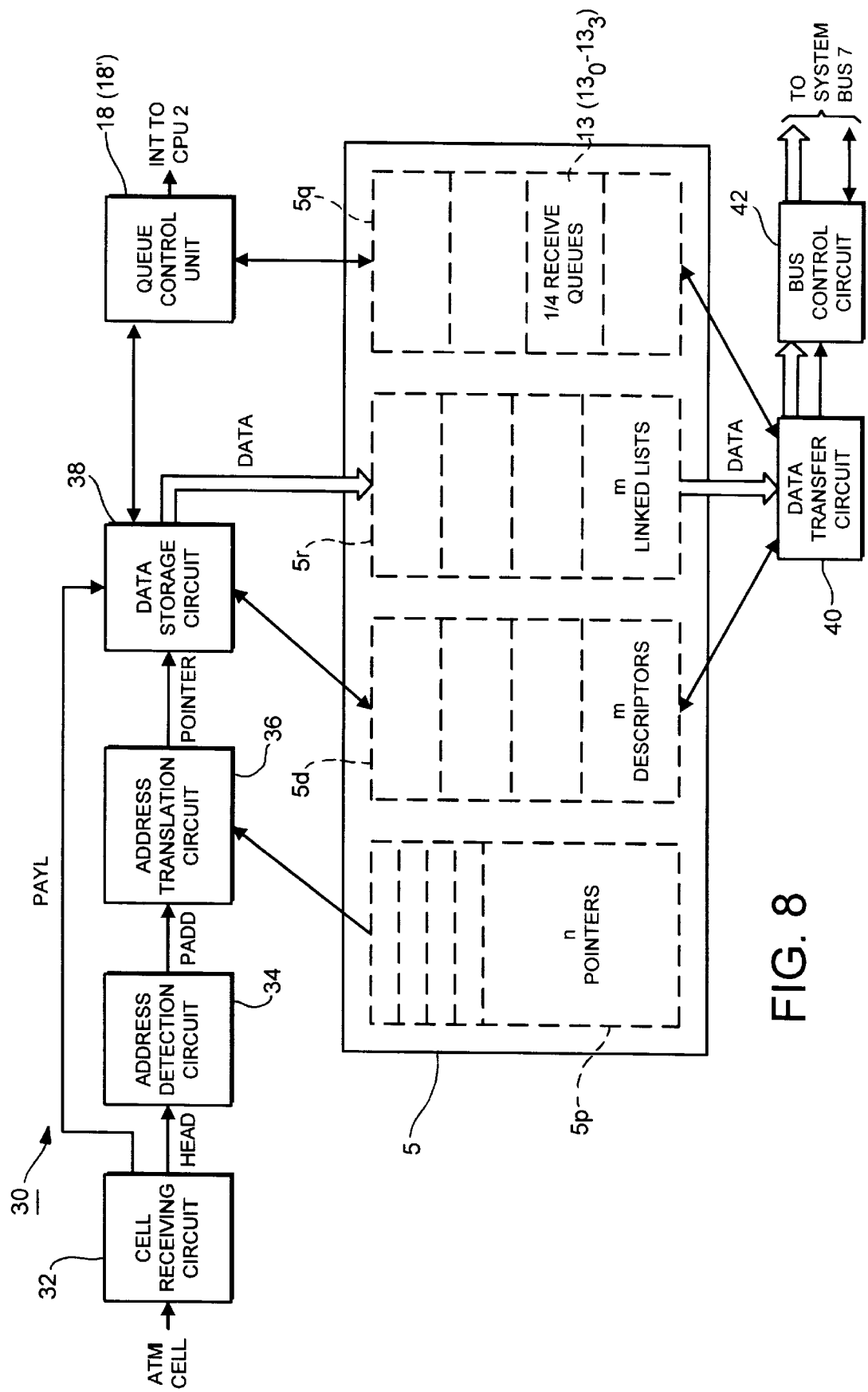
FIG. 8 shows a block diagram of receive data processing circuitry included in the FIG. 1 device.

FIG. 8 shows an example of receive data processing circuitry 30 suitable for use in the terminal controller 4. The circuitry 30 includes a cell receiving circuit 32, an address detection circuit 34, an address translation circuit 36, a data storage circuit 38, and a queue control unit 18 or 18' which is constituted as described above with reference to FIG. 4(A) or FIG. 5. In the latter case the circuitry 30 further includes a data transfer circuit 40, and a bus control circuit 42.

In use of the circuitry 30, ATM cells received from the transceiver unit 6 are applied to an input of the cell receiving circuit 32, and the cell receiving circuit 32 splits up each received cell into its respective header and payload portions HEAD and PAYL. The header portion HEAD is supplied to the address detection circuit 34, whilst the payload portion PAYL is supplied to the data storage circuit 38.

The address detection circuit 34 takes the VPI/VCI fields of the header portion HEAD and forms a pointer address PADD by concatenating the least significant P bits of the VPI field and the least significant C bits of the VCI field. The pointer address PADD is supplied to the address translation circuit 36 which uses the pointer address to read, from the pointer storage region 5p, the pointer for the virtual channel to which the cell concerned belongs. This pointer identifies the output channel of the terminal controller that has been preselected by the CPU 2 to receive data from that virtual channel.

The pointer read by the address translation circuit 36 is then supplied to the data storage circuit 38 which uses it to access the descriptor for the output channel concerned stored in the descriptor storage region 5d of the local memory 5. Then, using the information contained in the descriptor, the data storage circuit 38 stores the payload portion PAYL of the cell in the linked list for that output channel, which list is stored in the receive data region 5r of the local memory 5. The queue control unit 18(18') makes a new entry in the receive queue 13 (or the relevant receive queue $13_0$ to $13_3$ in the FIG. 5 case) when the amount of data stored in the linked list for that output channel exceeds the threshold level specified for that channel. An interrupt signal is generated by the queue control unit 18 when the first entry is made on the receive queue.

If the terminal controller 4 is a bus master device (FIG. 5) the data transfer circuit 40 is also operative to monitor the receive queues and schedule transfer of the stored data for the different channels based on the designated priorities of the channels. The data transfer circuit accesses the descriptors as necessary to retrieve the stored data from the linked lists. The bus control unit 42 controls the system bus 7 as necessary to effect transfer (DMA transfer) of the data retrieved from the relevant linked list to the main memory 3 without intervention of the CPU 2.

It will be appreciated that, although in the embodiment described above the pointers for the selected virtual channels provide addresses in the descriptor storage region $5_b$, each pointer could alternatively be just the output channel number of the output channel associated with the virtual channel concerned. Even if descriptors are used, it is not necessary for the pointers to indicate the descriptor addresses directly; it is sufficient for the pointer storage region to store any parameter which identifies the output channel associated with the virtual channel concerned. It will also be understood that, although in the embodiment described above the pointer storage region, descriptor storage region, receive data storage region and queue storage region are all contained in the local memory 5 which is separate from the terminal controller 4, any or all of those four regions could alternatively be included within the terminal controller itself.

The provision of one or more receive queues is not essential; any suitable means of making information available to the controlling CPU (or other apparatus connected with the data receiving device) concerning the received data can be provided. It is not necessary that entries are made in the receive queues only upon storage of threshold amounts of data; an entry could be made each time any data is stored for the channel concerned.

The descriptor can have many different formats other than that shown in FIG. 3. For example, the descriptors could store any relevant further information concerning the output channels, for example the accumulated error rate for the channel concerned, or some indication of the type of data being transferred via the channel.

It will also be understood that the receive data for each output channel need not be stored in the form of a linked list; any other suitable data storage format can be employed.

Similarly, it is not necessary to employ the linked list to reconstitute AAL frames in the receive data storage region. In some situations, such reconstitution of the frames may not be required at all, and even if it is it can be performed elsewhere than in the received data storage region.

It will also be understood that embodiments of the present invention are not restricted to use in personal computers; a data receiving device embodying the present invention can be employed to transfer data from an ATM network to any data processing apparatus requiring access to such a network.

What we claim is:

1. A data receiving device in an egress node of an ATM network, for receiving data from the ATM network to be transferred to a terminal apparatus connected with the data receiving device in said egress node, the data receiving device comprising:

data storage means for allocating preselected virtual channels of the network to respective corresponding storage regions in memory means connected with the data receiving device, storing received data items, when data items belonging to different preselected virtual channels are received in succession, in storage regions that correspond respectively to virtual channels of the received data items, to permit transfer of the received data items within the egress node, from the memory means to said terminal apparatus, in a different channel order from that in which the data items were received by the data receiving device from the ATM network; and queue control means for controlling a receive queue and, following storage, by the data storage means, of one or more data items belonging to one of the preselected virtual channels in the storage region corresponding to the one preselected virtual channel, adding a new entry to the receive queue identifying the one preselected virtual channel as having stored data for transfer to said terminal apparatus.

2. A device as claimed in claim 1, further comprising priority designating means, connected with the queue control means, for assigning to each preselected virtual channel one of a plurality of different priority levels, wherein the queue control means includes, as part of each entry added to the receive queue, priority information indicating a priority level assigned to the preselected virtual channel.

3. A device as claimed in claim 1, further comprising priority designating means connected with the queue control means, for assigning to each preselected virtual channel one of a plurality of different priority levels, wherein the queue control means controls a plurality of receive queues corresponding respectively to said plurality of different priority levels, and following storage by the data storage means of one or more data items belonging to one of the preselected virtual channels, adding a new entry to the receive queue corresponding to the designated priority level of the one preselected virtual channel.

4. A device as claimed in claim 3, further comprising data transfer means for monitoring entries in different receive queues to determine a channel order in which data is to be transferred from the storage regions of said memory means to said terminal apparatus.

5. A device as claimed in claim 4, wherein the data transfer means transfers data in an order starting with channels having entries in a highest-priority-level receive queue, and ending with channels having entries in a lowest-priority-level receive queue.

6. A device as claimed in claim 5, wherein said data transfer means suspends transfer of data from channels having entries in a lower-priority-level receive queue when a new entry is placed on a higher-priority-level receive queue.

7. A device as claimed in claim 1, wherein the queue control means generates an interrupt signal for application to said terminal apparatus when a new entry is added to the receive queue.

8. A device as claimed in claim 1, further comprising threshold designating means connected with the queue control means for designating, for each preselected virtual channel, a threshold level of data, and wherein the queue control means adds a new entry relating to one of the preselected virtual channels to the receive queue when the amount of data stored in the storage region corresponding to the one preselected virtual channel exceeds a designated threshold level.

9. A device as claimed in claim 1, wherein said data storage means allocates, to each preselected virtual channel, a linked list of data blocks within said memory means, wherein the linked list of data blocks provides said corresponding storage region for the virtual channel of the received data items.

10. A device as claimed in claim 9, wherein each data item is constituted by a payload portion of an ATM cell, and said data storage means employ said linked list for each preselected virtual channel to concatenate respective payload portions of successively-received ATM cells belonging to a same AAL frame of the preselected virtual channel, to permit the frame to be reconstituted in a storage region corresponding to the preselected virtual channel.

11. A device as claimed in claim 9, wherein said data storage means stores, for each preselected virtual channel, control information for use in storing the received data items in the linked list for the preselected virtual channel and/or for use in retrieving the stored data items from the linked list for transfer to said terminal apparatus.

12. A device as claimed in claim 11, wherein said preselected virtual channels are selected from within a group of available virtual channels of the network, and the data receiving device further comprises address translation means having access to a channel map having entries corresponding respectively to said available virtual channels of said group, each of which entries identifies one of a plurality of control information storage portions associated individually with the preselected virtual channel, wherein a number of control information storage portions is less than a number of available virtual channels of said group, and each control information storage portion is used for storing control information of corresponding to an associated virtual channel;

said address translation means determining, when a data item is received from the ATM network, a virtual channel to which the received data item belongs from addressing information carried by the received data item, and identifying, from an entry in a channel map that corresponds to the determined virtual channel, a control information storage portion associated with the determined virtual channel, to permit access by the data storage means to the control information for the determined virtual channel.

13. A device as claimed in claim 12, wherein said address translation means determines an entry in the channel map that corresponds to the received data item's virtual channel in dependence only upon a restricted portion of said addressing information carried by the received data item, which restricted portion is selectively-changeable in dependence upon a control signal applied to the data receiving device.

14. A device as claimed in claim 13, wherein said address translation means determines an entry in the channel map that corresponds to the received data item's virtual channel from one or more least significant bits of a virtual path identifier (VPI) field of said addressing information, and one or more least significant bits of a virtual channel identifier (VCI) field of said addressing information.

15. Data processing apparatus including:
a control unit for controlling operation of the apparatus;
a main memory;
a data receiving device, for receiving data from an ATM network;
bus means interconnecting the control unit, main memory and data receiving device; and a local memory connected with the data receiving device;
said data receiving device comprising:
    data storage means for allocating preselected virtual channels of the network respective corresponding storage regions in said local memory, and operable, when data items belonging to the different preselected virtual channels are received in succession by the device, to store those items in the storage regions that correspond respectively to the items' virtual channels, thereby to permit transfer of the received data items, from said local memory to said main memory, to be performed in a different channel order from that in which those items were received by the device from the network;
    queue control means for controlling a receive queue and operative, following storage by the data storage means of one or more data items belonging to one of the preselected virtual channels in the storage region corresponding to that virtual channel, to add a new entry to the receive queue identifying the virtual channel concerned as having stored data for transfer to said main memory; and
    priority designating means connected with the queue control means for assigning to each preselected virtual channel one of a plurality of different priority levels, the queue control means including as part of each entry added to the receive queue priority information indicating the priority level assigned to the channel concerned;
said control unit being operable to monitor the entries in said receive queue of the data receiving device to determine the channel order in which data is to be transferred from the storage regions of the local memory to the main memory, and to control said bus means to effect such transfer in the determined order.

16. Data processing apparatus including:
a control unit for controlling operation of the apparatus;
a main memory;
a data receiving device for receiving data from an ATM network;
bus means interconnecting the control unit, main memory and data receiving device; and
a local memory connected with the data receiving device;
said data receiving device comprising:
    data storage means for allocating preselected virtual channels of the network respective corresponding storage regions in said local memory, and operable, when data items belonging to the different preselected virtual channels are received in succession by the device, to store those items in the storage regions that correspond respectively to the items' virtual channels, thereby to permit transfer of the received data items, from said local memory to said main memory, to be performed in a different channel order from that in which those items were received by the device from the network;
    queue control means for controlling a receive queue and operative, following storage by the data storage means of one or more data items belonging to one of the preselected virtual channels in the storage region corresponding to that virtual channel, to add a new entry to the receive queue identifying the virtual channel concerned as having stored data for transfer to said main memory;
    priority designating means connected with the queue control means for assigning to each preselected virtual channel one of a plurality of different priority levels, the queue control means serving to control a plurality of such receive queues corresponding respectively to said different priority levels, and being operable, following storage by the data storage means of one or more data items belonging to one of the preselected virtual channels, to add a new entry to the receive queue corresponding to the designated priority level of the channel concerned;
    data transfer means operative to monitor the entries in the different receive queues to determine the channel order in which data is to be transferred from the storage regions of said local memory to said main memory; and bus control means connected with said data transfer means for controlling the bus means independently of the control unit to facilitate transfer of data by the data transfer means directly from the storage region of the local memory to the main memory.

17. Apparatus as claimed in claim 16, wherein the data transfer means transfer data in the order starting with channels having entries in the highest-priority-level receive queue and ending with the channels having entries in the lowest-priority-level receive queue.

18. Apparatus as claimed in claim 17, wherein said data transfer means are operable to suspend transfer of data from channels having entries in a lower-priority-level receive queue when a new entry is placed on a higher-priority-level receive queue.

19. A data receiving device, for receiving data from an ATM network, comprising:
    data storage means for allocating preselected virtual channels of the ATM network to respective corresponding storage regions in memory means connected with the data receiving device, wherein when data items belonging to different preselected virtual channels are received in succession by the data receiving device, the data storage means stores the received data items in storage regions that correspond respectively to virtual channels of the received data items, to permit transfer of the received data items, from the memory means to a further apparatus connected with the data receiving device in a different channel order from that in which the data items were received by the data receiving device from the ATM network;
    threshold designating means connected with the queue control means for designating, for each preselected virtual channel, a threshold level of data; and
    queue control means for controlling a receive queue separate from said storage regions in which the received data items are stored, said queue control means adding a new entry to the receive queue, identifying a virtual channel as having stored data for transfer to said further apparatus, wherein when, following storage by the data storage means of one or more data items belonging to one of the preselected virtual channels in the storage region corresponding to that virtual channel, an amount of data stored in the storage region corresponding to the virtual channel exceeds a designated threshold level.

20. A device as claimed in claim 19, wherein the queue control means generates an interrupt signal for application to said further apparatus when a new entry is added to the receive queue.

21. A data receiving device, for receiving data from an ATM network, comprising data storage means for allocating preselected virtual channels of the ATM network to respective corresponding linked lists of data blocks in memory means connected with the data receiving device, wherein data items, belonging to different preselected virtual channels and received in succession by the data receiving device are stored in a linked list that corresponds respectively to virtual channels of the received data items, to permit transfer of the received data items, from the memory means to said further apparatus, in a different channel order from that in which the data items were received by the data receiving device from the ATM network, wherein said data storage means stores, for each preselected virtual channel, control information for use in storing the received data items in the linked list for the preselected virtual channel and/or for use in retrieving the stored data items from the linked list for transfer to said further apparatus, said preselected virtual channels are selected from within a group of available virtual channels of the network, and the data receiving device includes address translation means having access to a channel map having entries corresponding respectively to said available virtual channels of said group, each of which entries identifies one of a plurality of control information storage portions associated individually with the preselected virtual channel, wherein a number of control information storage portions is less than a number of available virtual channels of said group, and each control information storage portion is used for storing control information of the associated virtual channel;

said address translation means determining, when a data item is received from the ATM network, a virtual channel to which the received data item belongs in dependence only upon a restricted portion of said addressing information carried by the received data item, which restricted portion is selectively-changeable in dependence upon a control signal applied to the data receiving device, and to identify from an entry in a channel map that corresponds to the determined virtual channel, a control information storage portion associated with the determined virtual channel, so as to permit access by the data storage means to the control information for the predetermined virtual channel.

22. A device as claimed in claim 21, wherein said address translation means determines the entry in the channel map that corresponds to the received data item's virtual channel from one or more least significant bits of a virtual path identifier (VPI) field of said addressing information, and one or more least significant bits of a virtual channel identifier (VCI) field of said addressing information.

23. A data receiving device, for receiving data from an ATM network, comprising:

data storage means for allocating preselected virtual channels of the ATM network to respective corresponding storage regions in memory means connected with the data receiving device, wherein data items belonging to different preselected virtual channels which are received in succession by the data receiving device are stored in linked lists that correspond respectively to virtual channels of the received data items, so as to permit transfer of the received data items, from the memory means to a further apparatus connected with the data receiving device in a different channel order from that in which the data items were received by the data receiving device from the ATM network, wherein said data storage means stores, for each preselected virtual channel, control information for use in storing the received data items in the linked list for the preselected virtual channel and/or for use in retrieving the stored data items from the linked list for transfer to said further apparatus;

queue control means for controlling a receive queue and, following storage by the data storage means of one or more data items belonging to one of the preselected virtual channels in the storage region corresponding to the one preselected virtual channel, adding a new entry to the receive queue identifying the one preselected virtual channel as having stored data for transfer to said further apparatus;

priority designating means connected with the queue control means, for assigning to each preselected virtual channel one of a plurality of different priority levels, wherein the queue control means includes, as part of each entry added to the receive queue, priority information indicating a priority level assigned to the one preselected virtual channel, and wherein a channel order in which transfer of data items from the memory means to said further apparatus is performed is determined in dependence upon respective priority-information parts of entries in the receive queue.

* * * * *

UNITED STATES PATENT AND TRADEMARK OFFICE
CERTIFICATE OF CORRECTION

PATENT NO.:     5,936,956
DATED      :    August 10, 1999
INVENTOR(S):    Finbar NAVEN It is certified that error appears in the above-identified patent and that said Letters Patent is hereby corrected as shown below:

On the title page, [30] Foreign Application Priority Data, change "9516512" to --9516212.2--.

On the title page, [56] References Cited, Foreign Patent Documents, change "409149050" to --409149050A--.

Signed and Sealed this

Twenty-eighth Day of December, 1999

*Attest:*

Q. TODD DICKINSON

*Attesting Officer*     *Acting Commissioner of Patents and Trademarks*